US009637016B2

(12) United States Patent
Gjinali et al.

(10) Patent No.: US 9,637,016 B2
(45) Date of Patent: May 2, 2017

(54) FAST CHARGING SYSTEM FOR ELECTRIC VEHICLES

(71) Applicants: Agim Gjinali, Lugano (CH); Brian Joseph O'Connor, Joliet, IL (US); Rron Gjinali, Lugano (CH)

(72) Inventors: Agim Gjinali, Lugano (CH); Brian Joseph O'Connor, Joliet, IL (US); Rron Gjinali, Lugano (CH)

( * ) Notice: Subject to any disclaimer, the term of this patent is extended or adjusted under 35 U.S.C. 154(b) by 769 days.

(21) Appl. No.: 13/898,055

(22) Filed: May 20, 2013

(65) Prior Publication Data

US 2014/0167694 A1 Jun. 19, 2014

Related U.S. Application Data

(60) Provisional application No. 61/737,260, filed on Dec. 14, 2012.

(51) Int. Cl.
*H02J 7/00* (2006.01)
*B60L 11/18* (2006.01)

(52) U.S. Cl.
CPC ......... *B60L 11/1824* (2013.01); *B60L 11/185* (2013.01); *B60L 11/1825* (2013.01); *B60L 11/1846* (2013.01); *B60L 11/1848* (2013.01); *B60L 11/1861* (2013.01); *B60L 11/1877* (2013.01); *B60L 2230/20* (2013.01); *B60L 2230/28* (2013.01); *B60L 2240/662* (2013.01); *Y02T 10/7005* (2013.01); *Y02T 10/705* (2013.01); *Y02T 10/7044* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/169* (2013.01); *Y04S 30/14* (2013.01)

(58) Field of Classification Search
CPC   B60L 11/1824; B60L 11/185; B60L 11/1842; B60L 2230/28; B60L 11/1825; B60L 11/1846; B60L 11/1848; B60L 11/1861; B60L 11/1877; B60L 2230/20; B60L 2240/662; Y02T 10/7088; Y02T 90/128; Y02T 10/7005; Y02T 10/7044; Y02T 10/705; Y02T 10/7291; Y02T 90/121; Y02T 90/14; Y02T 90/16; Y02T 90/169; Y04S 30/14
USPC ................................................ 320/101, 109
See application file for complete search history.

(56) References Cited

U.S. PATENT DOCUMENTS

| | | |
|---|---|---|
| 2002/0106540 A1 | 8/2002 | Shioya |
| 2008/0044323 A1 | 2/2008 | Rosas |
| 2009/0246596 A1* | 10/2009 | Sridhar ............... B60L 11/1816 429/513 |
| 2010/0134067 A1* | 6/2010 | Baxter .................. B60L 3/0084 320/109 |

(Continued)

*Primary Examiner* — Nathaniel Pelton
(74) *Attorney, Agent, or Firm* — Edward K. Runyan; Baker & McKenzie LLP (57) ABSTRACT

The embodiments described and claimed herein are apparatus, systems, and methods for charging an electric vehicle at a stationary service station. In one embodiment, the service station includes a power generation component including at least one fuel cell, a fuel supply component for supplying fuel to the power generation component, a charging component including at least one customer charging station, and a control component for controlling and monitoring the other components and for providing accounting and billing functions.

24 Claims, 8 Drawing Sheets

(56) References Cited

U.S. PATENT DOCUMENTS

| | | | |
|---|---|---|---|
| 2011/0055037 A1* | 3/2011 | Hayashigawa | B60L 3/0069 |
| | | | 705/26.1 |
| 2011/0115425 A1* | 5/2011 | Olsson | B60L 3/0046 |
| | | | 320/101 |
| 2012/0138261 A1* | 6/2012 | Park | B60H 1/00385 |
| | | | 165/43 |
| 2013/0036763 A1* | 2/2013 | Vist | F25J 1/0022 |
| | | | 62/611 |
| 2013/0049677 A1* | 2/2013 | Bouman | B60L 1/003 |
| | | | 320/106 |

* cited by examiner

FAST CHARGING SYSTEM FOR ELECTRIC VEHICLES

CROSS-REFERENCE TO RELATED APPLICATIONS

This application is based on and claims priority to U.S. Provisional Patent Application Ser. No. 61/737,260, filed on Dec. 14, 2012. U.S. Provisional Patent Application Ser. No. 61/737,260 is incorporated herein in its entirety by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTIONS

Technical Field

The embodiments described and claimed herein relate generally to systems, apparatus, and methods for simultaneously charging the batteries of multiple Electric Vehicles. More specifically, at least some of the embodiments described herein relate to systems, apparatus, and methods for charging Electric Vehicles independent from the electric grid, using Liquid Natural Gas (referred to herein as "LNG") or Natural Gas ("NG") as an energy source.

Background Art

Concern about global climate change and the increasing cost of gasoline has reinvigorated the public's interest in and demand for "green" technology. The use of electric drive systems in vehicles has the potential to be inexpensive and to greatly reduce the emission of greenhouse gases. However, it is believed that electric vehicles will never be successful until they are made to feel like ordinary, gasoline-powered vehicles. Manufacturers have begun to address this concern. For example, some electric cars will "creep" when you take your foot off the brake, just like an ordinary car. There is no reason to do this except to give it the feel of an ordinary vehicle.

One area in which the electric vehicle industry is lacking is the time required to fully charge an electric vehicle. It is understood that existing charging systems which rely on the electric grid (even those dubbed "fast" charging systems) require thirty (30) minutes or longer to fully charge an electric vehicle. It is believed that electric vehicles will not gain wide acceptance by the public until it is possible to drive an electric vehicle up to a service station, plug it in for a charge, swipe a credit card, go inside to buy a cup of coffee, come out, disconnect the electric vehicle, and drive off, just like you can in an ordinary vehicle. It is also believed that existing charging systems cannot be widely implemented in a cost effective manner due to their heavy reliance on the electric grid. The existing electric power generation and distribution system is not capable of providing for the peak time charging of significant numbers of electric vehicles. Expansion of the power generation and distribution system will be required. Since a fast charge places a very heavy load on the grid, utilities will likely impose significant demand premiums on each charge.

Thus, there are at least two drawbacks to existing charge systems that rely upon the electric grid: the time required for a charge and the ultimate cost of electricity from the grid. The Fast Charge System disclosed and claimed herein solves both of those problems.

BRIEF SUMMARY OF THE INVENTIONS

The Fast Charging System provides a method for simultaneously charging the batteries of multiple electric vehicles, largely independent from the electric grid (the power that is used to charge the Electric Vehicle does not originate from the grid; however, certain components of the embodiments described and claimed herein may be powered by the grid), using LNG or NG as an energy source. It can efficiently provide DC charging power tailored to the requirements of the individual vehicles being charged. It is estimated that a vehicle with a battery capacity of 85 kWh can be fully charged in less than 10 minutes using the Fast Charging System.

In a first embodiment, an electric vehicle charging facility is provided that includes a power generation component, a fuel component, and a charging component. The power generation component generates DC electric power and includes at least one fuel cell. The fuel component supplies fuel to the power generation component. The charging component is electrically connected to the power generation component for charging an electric vehicle using the DC electric power and includes at least one customer charging station.

In a second embodiment, an electric vehicle charging facility is provided that includes a power generation component, a fuel component, a charging component, and a control system component. The power generation component generates DC electric power and includes a plurality of polymer electrolyte membrane fuel cells each having a capacity of 100 kW or less. The fuel component supplies natural gas to the power generation component. The charging component is electrically connected to the power generation component for simultaneously charging a plurality of electric vehicles using the DC electric power and includes a plurality of customer charging stations. The control system component comprises a processor, a data storage, and instructions stored in the data storage and executable by the processor to activate the plurality of fuel cells sequentially to meet an energy demand of the charging component.

In a third embodiment, an electric vehicle charging facility is provided that includes a power generation component, a fuel component and a charging component. The power generation component generates DC electric power and includes at least one fuel cell having a capacity of between approximately 400 kW and approximately 500 kW. The fuel component supplies natural gas to the power generation component. The charging component is electrically connected to the power generation component for charging an electric vehicle using the DC electric power and includes at least one customer charging station. The power generation component also includes a converter for converting at least a portion of the DC electric power to an AC electric power.

Other embodiments, which include some combination of the features discussed above and below and other features which are known in the art, are contemplated as falling within the claims even if such embodiments are not specifically identified and discussed herein.

BRIEF DESCRIPTION OF THE SEVERAL VIEWS OF THE DRAWINGS

These and other features, aspects, objects, and advantages of the embodiments described and claimed herein will become better understood upon consideration of the following detailed description, appended claims, and accompanying drawings where:

FIG. 1A-1 is an exploded view of the Fuel Component 200 and the Power Generation Component 300 of a Fast Charge System;

FIG. 1A-2 is an exploded view of the Charging Component 400 of a Fast Charge System;

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION OF THE INVENTIONS

Figure 1:
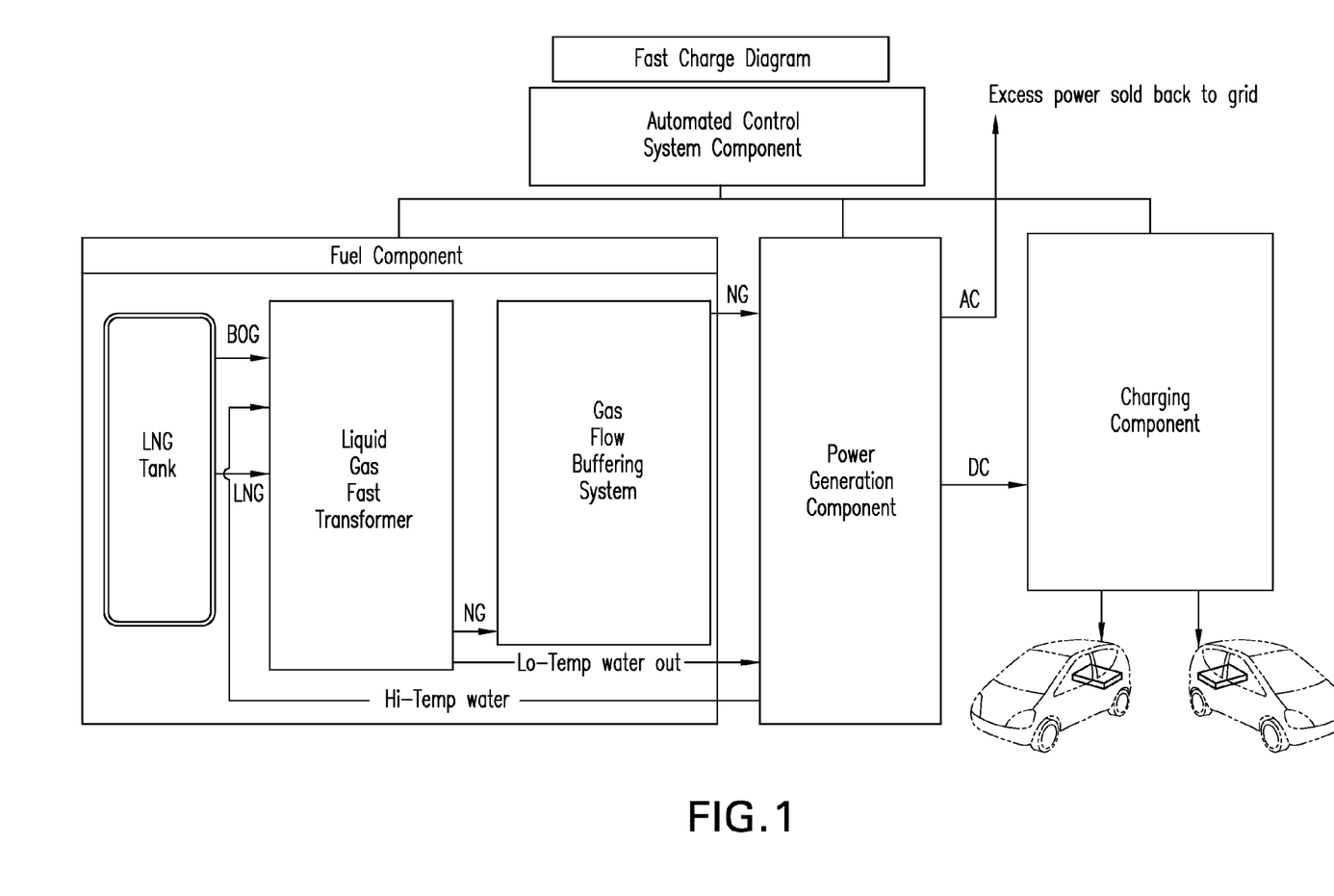
FIG. 1 is a block diagram depicting the several components of a Fast Charge System.

Referring first to FIG. 1, a block diagram depicts a first embodiment of a Fast Charge System 1. The Fast Charge System 1 includes four main components, the Automated Control System Component 100, the Fuel Component 200, the Power Generation Component 300, and the Charging Component 400. The Automated Control System Component 100 controls the system. The Fuel Component 200 stores LNG and converts it, at a controlled and varying rate, into Natural Gas that will be used to produce DC Power to charge Electric Vehicles. In an alternative embodiment, the Fuel Component 200 can provide low pressure, piped NG instead of storing and converting LNG. The Power Generation Component 300, using the Natural Gas from the Fuel Component 200, produces, at a controlled and varying rate, DC Power 302 for the Charging Component 400 and Hot Water 502 that is used by the Fuel Component 200, and may optionally produce AC Power 304 that can be sold back to the grid or used for other purposes at the facility. The Charging Component 400 is the element used to dispense the DC Power 302 to the customer through separate Customer Charging Stations 410A, 410B (shown in FIG. 1A-2).

Referring now to FIG. A1-1, the Automated Control System Component 100 controls the system. At the individual customer charging station 410A, 410B, the customers will select the charging time, with the shorter the time the higher the price. More particularly, the customer inputs the time of charge and the amount of charge. For instance, the customer might select a charge time of 15 minutes and a total charge of 80% of the total capacity of the vehicle battery system. Alternatively, the customer can be presented with multiple charging options representing different charging times, different total charges, different rates of charge, and different prices, from which the customer can select. The connection plug from the vehicle to the charging station 410A, 410B will communicate the level of charge in the vehicle system before the charging begins as well as the vehicle battery system characteristics and capabilities. The Automated Control System 100 will register the customer payment information, the amount and rate of charge, and compute the volume of Natural Gas 273 required for the Power Generation Component 300 to generate the DC Power 302 required to charge all vehicles at the station and the amount of LNG necessary to produce that Natural Gas 273. More particularly, the Automated Control System 100 computes the amount of power required to charge the customer's battery in the time selected. The volume of Natural Gas 273 required is based upon the efficiency and productivity of the Fuel Cell(s) 310. The volume of LNG required is based upon the efficiency and productivity of the Liquid to Natural Gas Fast Transformer (referred to herein as "LNFT") 230.

The Automated Control System 100 also controls and monitors other components in the system. The Automated Control System Component 100 also keeps track of LNG supply, provides an accounting and billing system and monitors the performance of various components. The Fast Charge System 1 can be monitored locally, remotely or both.

Figure 1A:
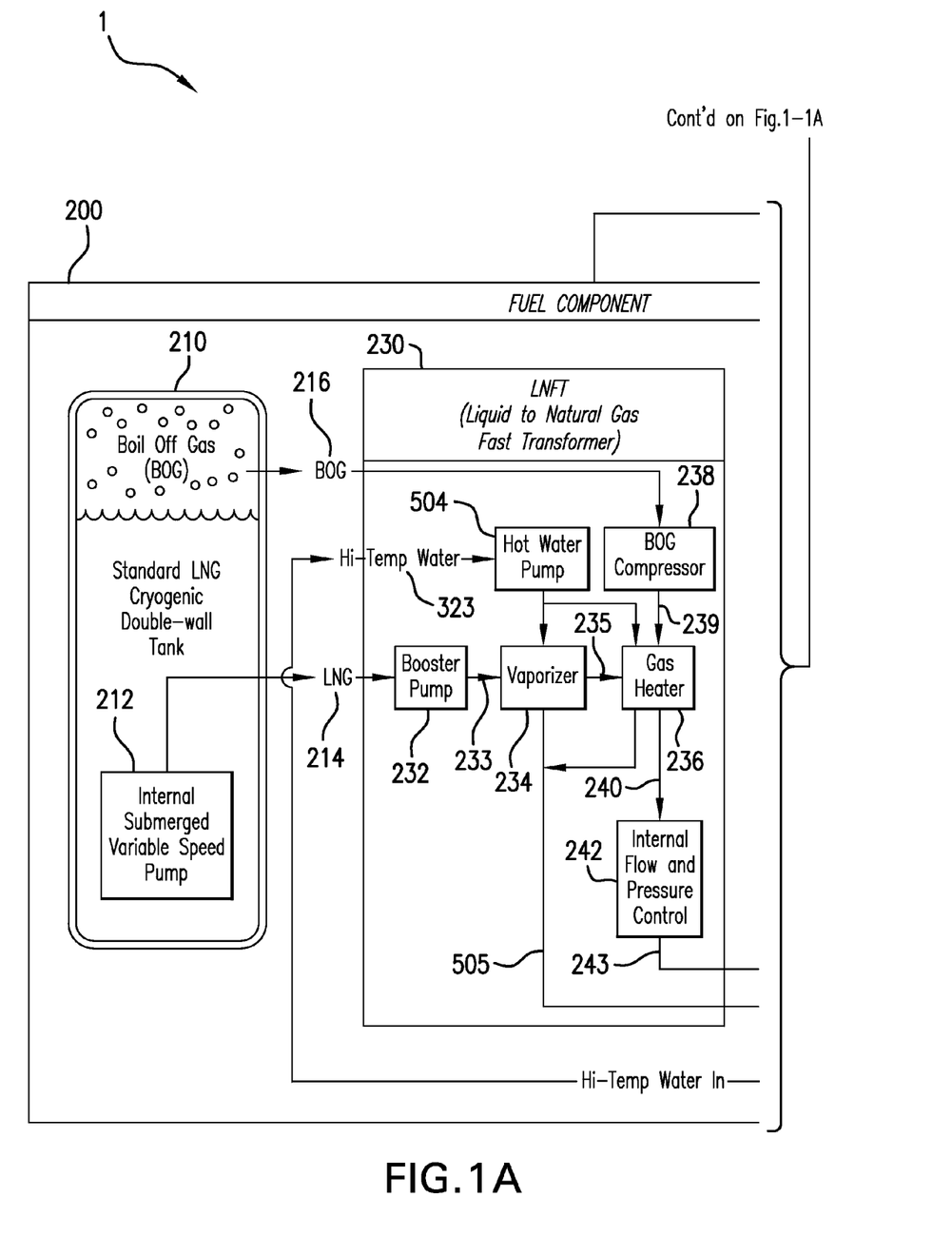
FIG. 1A is an exploded view of the Fuel Component 200 of a Fast Charge System.
Figure 1A:
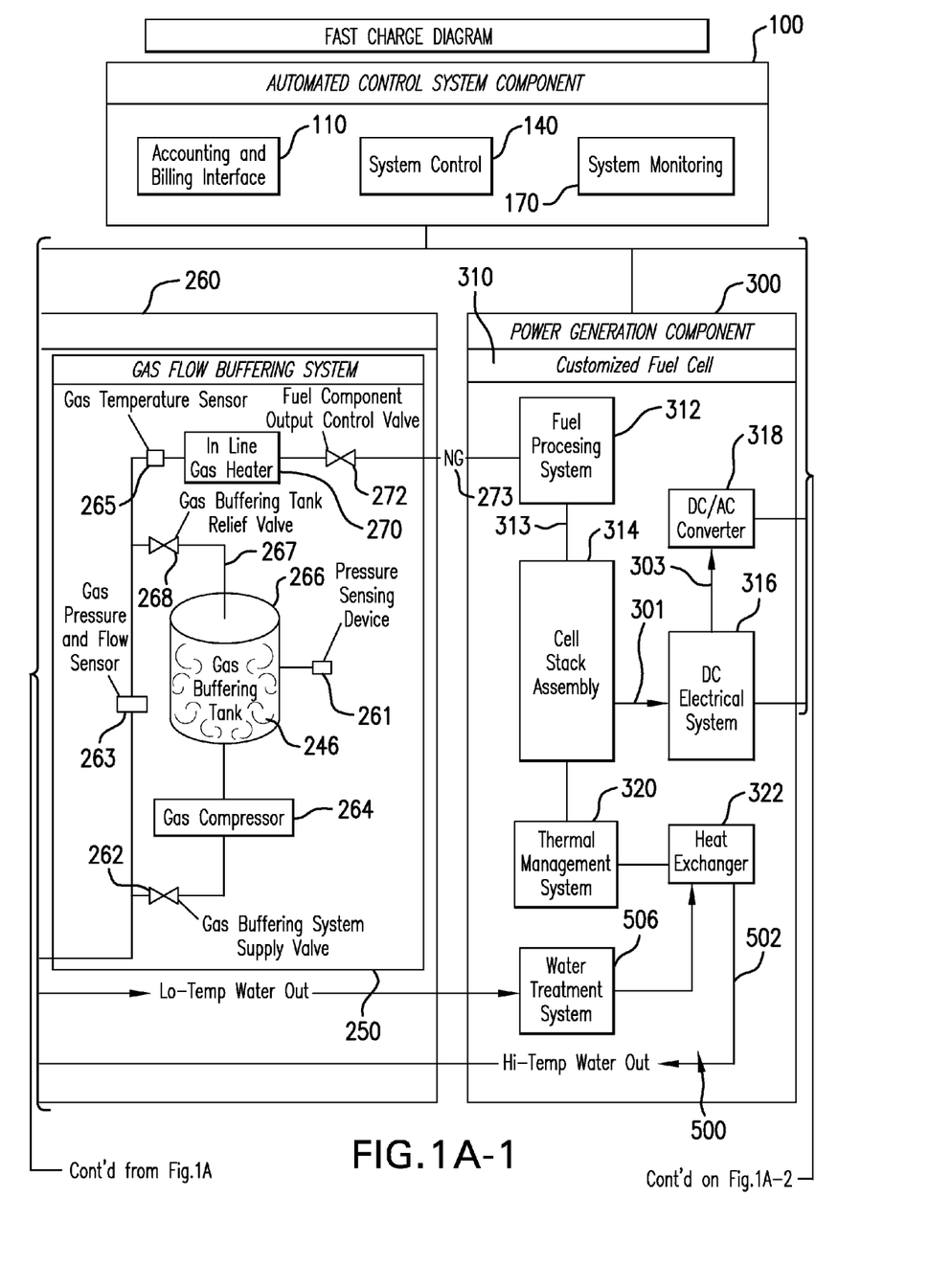
Figure 1A:
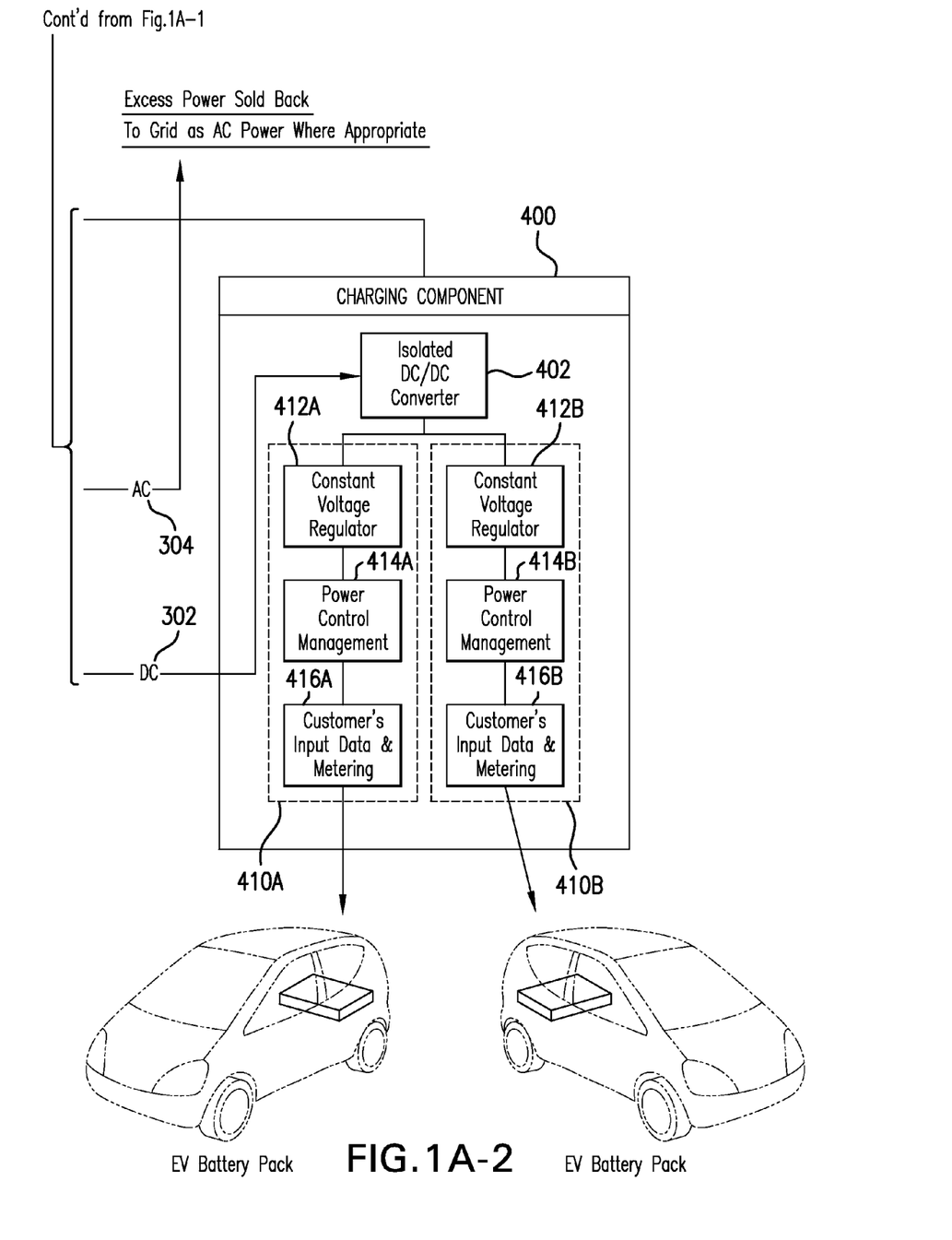

In the shown embodiment in FIG. 1A, the Fuel Component 200 stores LNG and converts it, at a controlled and varying rate, into Natural Gas 273 that will be used to produce DC Power 302 to charge Electric Vehicles. The Fuel Component 200 consists of three elements—the LNG Storage Tank 210, the LNFT 230, and the Gas Flow Buffering System 250.

The LNG Storage Tank 210 is a standard LNG cryogenic double-wall container able to keep the LNG 214 at the needed temperature. The LNG Storage Tank 210 is a conventional or standard tank. LNG 214 is stored at approximately −260 degrees F. Although at that temperature, it exists at atmospheric pressure, LNG tanks are usually rated at 200 psig. The LNG 214 is usually stored at 40 psig. The size of the tank will depend upon the market at the location of the installation as well as the frequency of delivery of LNG 214 replacement. It is expected that in no case will the tank be larger than that with a capacity of about 3,000 gallons of LNG.

The LNG Storage Tank 210 may include an internal submerged variable speed pump 212 to send LNG 214 to the LNFT 230. The size of the variable speed pump 212 will depend upon the number of charging stations 410A, 410B, the capacity of the LNFT 230 and the expected market. To charge an 85 kWh battery in approximately five minutes will require the simultaneous operation of one 500 kW fuel cell stack or five 100 kW fuel cell stacks. In either case, the fuel stack(s) will require approximately ½ gallon of LNG per minute worth of energy. If the service station installation had ten 100 kW fuel cell stacks, then the maximum flow rate from the variable speed pump would be 1 gallon per minute. The pressure rating required for the pump will be specific to the piping design at the individual site. As an option, the pump 212 can be external or included within the LNFT 230.

The LNFT 230 produces the fuel (Natural Gas 243) needed for the Power Generation Component 300 by a fast and automated pressure and flow controlled transformation of the LNG 214 into Natural Gas 243. The pumped LNG 214 is received by the LNFT 230 and then boosted internally by a high-pressure pump 232 and sent to the Vaporizer 234. The size of the pump 232 will depend upon the specific piping pressure loss at the site as well as the specific pressure requirements of the Vaporizer 234. The heating of the boosted LNG 233 in the Vaporizer 234 is done initially using electric resistance and later through hot water 502 from the heat recovery system in the Customized Fuel Cell 310. The Vaporizer 234 is similar to the Electric Heated Water Bath LNG Vaporizer as manufactured by DenEB Solutions, or equal, modified to accept hot water 502 that is heated using reclaimed heat from the Power Generation Component 300. From the Vaporizer 234, the Natural Gas 235 is sent to the Gas Heater 236. Rather than being released to the environment, the Boil Off Gas (referred to herein as "BOG") 216 from the LNG Storage Tank 210 is recovered, received by the LNFT 230 and sent directly to the BOG Compressor 238. Compressed BOG 239 is sent by the BOG Compressor 238 to the Gas Heater 236. The heating of the gas 235, 239 in the Gas Heater 236 is also done initially with electric resistance heating and later with hot water 502 from the heat recovery system in the Fuel Cell(s). The purpose of the gas heater is to heat the combined gas from the vaporizer 234 and the BOG Compressor 238 to ambient air temperature, or within the input gas temperature requirements of the Fuel Cell Stack Assemblies. After the Gas Heater 236, the flow and pressure of the Natural Gas 240 is controlled internally by the Flow and Pressure Control Unit 242. The Flow and Pressure Control Unit 242 is a standard part of all standard vaporizer assemblies.

The Gas Flow Buffering System 260 is intended to provide for instantaneous flow of Natural Gas 243 from the Fuel Component 200 to the Power Generation Component 300 upon system start up, and to allow quick adjustments in fuel flow by throttling in stored Compressed Natural Gas 267 from a Gas Buffering Tank 266. Flow and pressure controlled Natural Gas 243 is received by the Gas Flow Buffering System 260 and can be sent to the Power Generation Component 300 either directly or indirectly. In the direct route, Natural Gas 243 passes through a gas pressure and flow sensor 263, a gas temperature sensor 265, an In Line Gas Heater 270, and a Fuel Component Output Control Valve 272. The purpose of the Gas Buffering System 260 is to buffer the flow of natural gas and to be able to alter the flow quicker, and not necessarily to increase the overall capacity. The flow of natural gas 273 exiting the Fuel Component 200 will depend upon the demand of the Power Generation Component 300. If there were ten 100 kW Fuel Cell stacks operating simultaneously at peak output then the natural gas flow would be approximately 120 cubic feet per minute, as shown in the chart below.

| Approximate Flow Rates | Number of Operating 100 kW fuel cells | |
|---|---|---|
| | 5 | 10 |
| Assumed Gallons/min LNG | 0.75 | 1.5 |
| Gallons of LNG/Hr | 45 | 90 |
| Gallons per Cu. Ft. | 7.48 | 7.48 |
| Cu. Ft. of LNG per Hr | 6.02 | 12.03 |
| Cu. Ft. of CNG per Cu. Ft. of LNG | 6 | 6 |
| Cu. Ft. of CNG per Hr | 36.09 | 72.19 |
| Cu. Ft. of NG per Cu. Ft. of LNG | 600 | 600 |
| Cu. Ft. of NG per Hr. | 3,609 | 7,219 |
| Cu. Ft. of NG per Minute | 60 | 120 |

The temperature of the Natural Gas 273 should be close to ambient temperature and within the operating parameters of the fuel cell system. The pressure should be close to atmospheric pressure.

In the indirect route, Natural Gas 243 bypasses the Gas Pressure and Flow Sensor 263, and is directed through a Gas Buffering System Supply Valve 264 on route to the Gas Buffering Tank 266 for later use by the Power Generation Component 300. Pressure in the Gas Buffering Tank 266 is monitored using Pressure Sensing Device 261. The Gas Buffering Tank 266 allows for instantaneous response when a customer calls for a DC charge. While there is nearly an instantaneous response from the Power Generation Component 300 (e.g., if a Polymer Electrolyte Membrane fuel cell is used), meaning that when gas is introduced to the Customized Fuel Cell 310, power is generated almost instantaneously, such is not the case with the regasification process of the LNFT 230. The Gas Buffering Tank 266, on the other hand, can provide instantaneous Natural Gas 273 to the Power Generation Component 300, allowing time for the LNFT 230 to spool up. In addition, during periods of instantaneous demand that exceeds the capacity of the LNFT 230, or to stabilize the mass flow rate of Natural Gas 273 to the Power Generation Unit 300, stored Natural Gas 267 can be throttled in via Gas Buffering Tank Relief Valve 268 at the outlet side of the Gas Pressure and Flow Sensor 263. The Gas Buffering Tank 266 should be a Type 1 CNG Storage Tank capable of storing up to 10,000 cu. Ft. of natural gas under 5,000 psi, which is the industry standard. Natural Gas 246 may be stored in the Buffering Tank at approximately 3,600 psi. When the Natural Gas exits the tank 266, it will be cold as it expands to atmospheric pressure and will need to be heated. The amount of heating required will depend upon the actual pressure in the Buffering Tank 266. The in line gas heater 270 is a standard system for treating gas. From the Gas Flow Buffering System 260, Natural Gas 273 is delivered to the Fuel Processing System 312 in the Power Generation Component 300.

In an alternative embodiment, the Fuel Component 200 omits LNG, the LNG Storage Tank 210, the LNFT 230 and the Gas Buffering System 260, and instead simply supplies low pressure, natural gas through appropriately sized piping with flow regulators and other necessary components known in the art to the Power Generation Component 300. In this embodiment, the natural gas would be supplied to the Fuel Component, for example, by a local natural gas utility through high capacity pipelines.

The Power Generation Component 300, using the Natural Gas 273 from the Fuel Component 200, produces, at a controlled and varying rate, DC Power 302 for the Charging Component 400, hot water 323 that is used in the LNFT 230 to convert LNG 214 to Natural Gas 243, and, optionally, AC current 304, where appropriate, that can be sold back to the grid. The Power Generation Component 300, shown in FIG. 1A-1, is comprised of a Fuel Processing System 312, a Fuel Cell Assembly 314, and a Thermal Management System 320. The Fuel Processing System 312 extracts hydrogen from the natural gas using a catalytic reforming process, or other suitable method. The hydrogen 313 is sent to the Fuel Cell Assembly 314 at approximately atmospheric pressure for the production of DC power 301. The Fuel Cell Assembly 314 consists of a stack of up to approximately ten individual Polymer Electrolyte Membrane (PEM) fuel cells, each one of which is capable of producing up to 100 kW. These fuel cells operate independently and are activated individually and sequentially, by the Automated Control System Component 100 to meet the energy demands of the Charging Component 400. In this embodiment, it would not be necessary for the Power Generation Component 200 to produce AC current 304, because the power output of the Fuel Cell Assembly 314 can be easily tailored to match the demand of the Charging Component 400. The operation of each fuel cell of the Fuel Cell Assembly can be randomized to equalize wear and tear among the various units. Power 301 produced by the individual fuel cells in the Fuel Cell Assembly is sent to the central DC Electrical System monitor 316 of the Power Generation Component 300 and from there on to the Charging Component 400.

In the alternative, the Fuel Cell Assembly 314 can comprise one or more customized fuel cells, each one of which is capable of producing up to, e.g., approximately 400-500 kW of DC power, designed to work with other components of the Fast Charge System. In this case, it is contemplated that the fuel cell will be operating full time. Excess capacity not being used by the Charging Component 400 would be converted to AC power 304 and either used by the facility or sold to the grid. For this embodiment, a Gas Flow Buffering System 260 would not be necessary.

PEM fuel cells typically operate at 50 to 100 degrees centigrade. The Thermal Management System 320 recovers excess heat generated by the fuel cells for use in the LNG vaporization process. A closed loop water cooling system 500, shown in FIG. 1A-1, is used with the Heat Exchanger 322 to cool the fuel cells of the Fuel Cell Assembly 314 and to provide hot water to the LNFT 230 for the conversion of LNG into Natural Gas. Hot Water Pump 504 pulls Hi-Temperature Outlet Water 502 from Heat Exchanger 322. Pump Outlet Water is directed to the vaporizer 234 and Gas Heater 236, which are aligned in parallel. Lo-Temperature Outlet Water 505 from the LNFT 230 is treated in the Water Treatment System 506 before being directed back to the Heat Exchanger 322 of the Customized fuel Cell 310. The purpose of the treatment is to basically filter the water of any particles or impurities it may have acquired in the flow through the vaporizer process.

The Charging Component 400 is the element used to dispense the DC Power 302 to the customer through separate Customer Charging Stations 410A, 410B. Two Customer Charging Stations 410A, 410B are shown, although any number can be provided. Customer Charging Station 410A, 410B may be any type of appropriate device for communicating with the Automated Control System Component 100. The Customer Charging Station may include one or more processors, storage devices, and communication interfaces, all communicatively interconnected. Each processor may include, for example, one or more integrated circuit microprocessors, and each storage may be a ROM, flash memory, non-volatile memory, optical memory, magnetic medium, combinations of the above, or any other suitable memory. Each storage may include more than one physical element, and may also include a number of software routines, program steps, or modules that are executable by a processor to carry out the various functions and processes described herein.

A typical site will include from four to eight Customer Charging Stations 410A, 410B. Since the voltage of the DC Power 302 generated by the Power Generation Component 300 varies in magnitude, it has to be converted by an Isolated DC/DC Converter 402 within the Charging Component 400. Each Customer Charging Station will have its own Constant Voltage Regulator 412A, 412B, Power Control Management Module 414A, 414B, and Customer Input Data and Metering Device 416A, 416B.

The Automated Control System Component 100 provides an Accounting and Billing Interface 110, a System Control 140, and a System Monitor 170. The Automated Control System Component 100 may include one or more processors, storage devices, and communication interfaces, all communicatively interconnected. Each processor may include, for example, one or more integrated circuit microprocessors, and each storage may be a ROM, flash memory, non-volatile memory, optical memory, magnetic medium, combinations of the above, or any other suitable memory. Each storage may include more than one physical element, and may also include a number of software routines, program steps, or modules that are executable by a processor to carry out the various functions and processes described herein.

The System Control 140 communicates with and/or controls the Internal Submerged Variable Speed Pump 212, the Gas Pressure and Flow Sensor 263, the Gas Temperature Sensor 265, the Gas Buffering system Supply Valve 262, the Gas Buffering Tank Relief Valve 268, the Gas Compressor 264, the Pressure Sensing Device 261, the DC/AC Converter 318, and the Customer's Input Data and Metering Device 416A, 416B. The System Monitor 170 communicates with and/or monitors the LNG level in the LNG Storage Tank 210, the Gas Pressure and Flow Sensor 263, the Gas Temperature Sensor 265, the Pressure Sensing Device 261, the DC Electrical System 316, and the Customer's Input Data and Metering Device 416A, 416B. The network interconnections between the Automated Control System Component 100 and the other components of the Fast Charge System can be implemented through a shared, public, or private network and encompass a wide are or local area. The network may be implemented through any suitable combination of wired and/or wireless communication networks. By way of example, the network may be implemented through a wide area network (WAN), local area network (LAN), an intranet, or the Internet.

Figure 2:
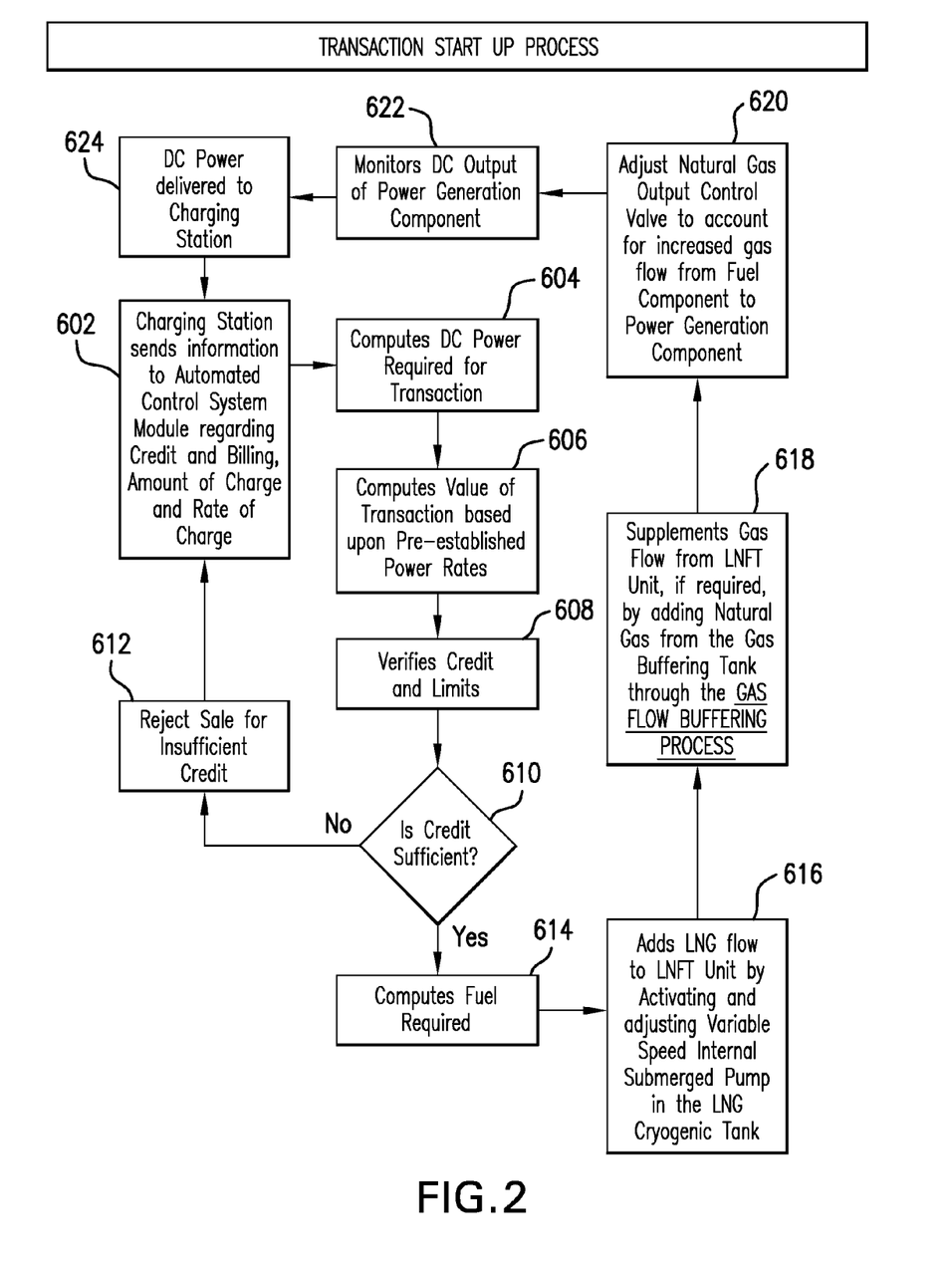
FIG. 2 is a flow chart depicting the transaction start up process of the first embodiment.

Referring now to FIG. 2, a flow chart depicts the transaction start up process of the first embodiment. The transaction start up process begins after the customer has selected the charging time and makes payment (e.g., cash) or inputs payment information (e.g., debit or credit card number) at the Customer Charging Station 410A, 410B. At the initial step 602, the Charging Station 410A, 410B sends information to the Accounting and Billing Interface 110 of the Automated Control System Component 100 regarding credit and billing, amount of charge, and rate of charge. In the next steps 604, 606, 608, the Accounting and Billing Interface 110 computes the DC power required for the transaction, computes the value of the transaction based upon pre-established power rates, and verifies credits and limits. In the next step 610, the Accounting and Billing Interface 110 determines whether credit is sufficient. If not, in the next step 612, the Accounting and Billing Interface 110 rejects the sale for insufficient credit. If credit is sufficient, in the next step 614, the Accounting and Billing Interface 110 computes the amount of fuel required and transmits that information to the System Control 140. In the next step 616, the System Control 140 activates and adjusts the Pump 212 in the LNG Storage Tank 210 to add LNG flow to the LNFT 230. In step 618, the System Control 140 supplements Natural Gas Flow 243 from the LNFT 230, if required, by adding Natural Gas 267 from the Gas Buffering Tank 266 through the gas flow buffering process shown in FIG. 3 and described below. In step 620, the System Control 140 adjusts the mass flow rate of Natural Gas 270 from the Fuel Component 200 to the Power Generation Component 300 by adjusting the Fuel Component Output Control Valve 272. In step 622, the System Monitor 170 monitors the DC Power 302. Steps 616, 618, 620, and 622 are contemplated as occurring concurrently, but can be initiated in any order. In the final step DC Power 302 is delivered to the Customer Charging Station 410A, 410B.

Figure 3:
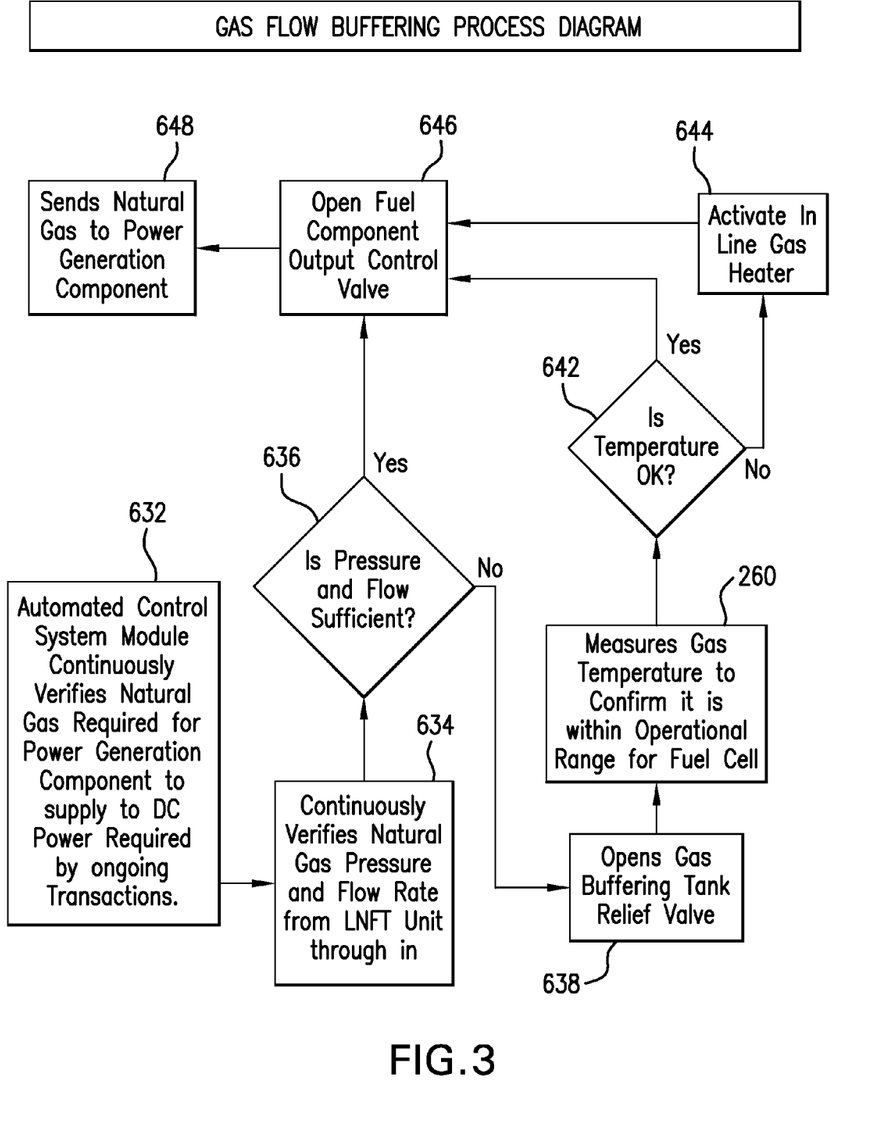
FIG. 3 is a flow chart depicting the gas flow buffering process of the first embodiment.

Referring now to FIG. 3, a flow chart depicts the gas flow buffering process of the first embodiment. In step 632, the System Control 140 of the Automated Control System 100 continuously verifies that Natural Gas 273 is required for the Power Generation Component 300 to supply DC Power 302 for an ongoing transaction. The gas flow buffering process terminates when DC Power 302 is no longer required for an ongoing transaction. In step 634, the System Monitor 170 of the Automated Control System 100 continuously monitors the flow rate and pressure of the Natural Gas 243 via Gas Pressure and Flow Sensor 263. In step 636, the System Control 140 continuously determines whether pressure and flow is sufficient. In not, in steps 638 and 640, the System Control 140 opens the Gas Buffering Tank Relief Valve 268 and the System Monitor 170 measures gas temperature via Gas Temperature Sensor 265. In step 642, the System Control 140 continuously determines when the gas temperature is acceptable for the Power Generation Component 300. Generally this will be ambient temperature, although it will depend upon the specifications of the fuel cell manufacturer. If not, in step 644, the System Control 140 activates the In Line Gas Heater 270. If the gas temperature is determined to be acceptable in step 642, the System Control 140 opens the Fuel Component Output Control Valve 272 in step 646. In step 648, Natural Gas 273 is sent to the Power Generation Component. If in step 636 it is determined that pressure and flow is sufficient, step 646 is initiated.

Figure 4:
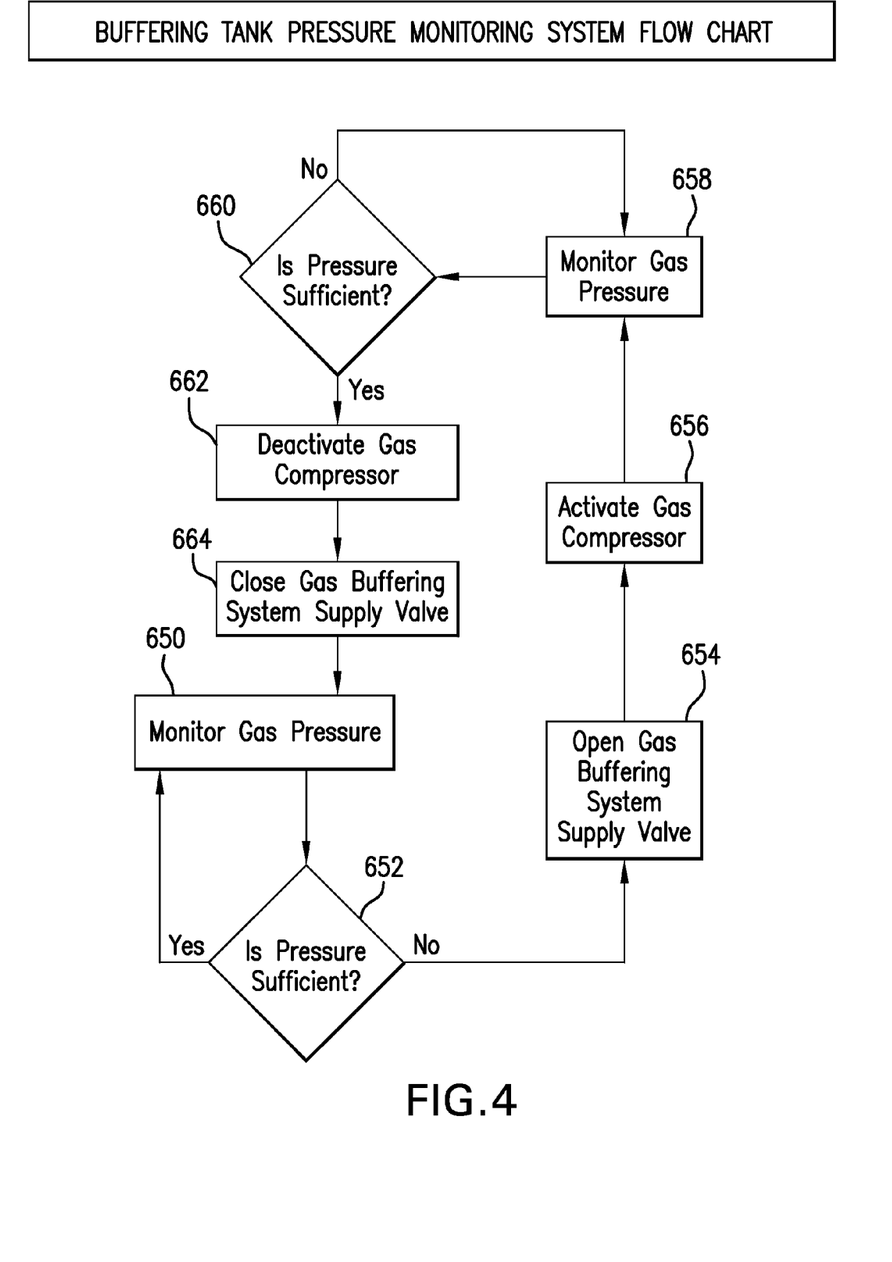
FIG. 4 is a flow chart depicting the pressure monitoring process for the Gas Buffering Tank of the first embodiment; and, FIG. 5 is a flow chart depicting the transaction monitoring and shut down process.

Referring now to FIG. 4, a flow chart depicts the pressure monitoring process for the Gas Buffering Tank 266, which ensures that the Gas Buffering Tank is maintained at an adequate pressure. It is contemplates that the Gas Buffering Tank 266 will be maintained at about 500 psi in order to avoid the need to heat Natural Gas 267 when it is throttled for use in the Power Generation Component 300. However, Natural Gas 267 could be stored at a much higher pressure, e.g., 3000 psi, but in that case the In Line Gas Heater 270 would most likely be required to warm the Natural Gas 273 before sending it to the Power Generation Component 300. In step 650, the System Monitor 170 of the Automated Control System 100 continuously monitors gas pressure in the Gas Buffering Tank 266 via Pressure Sensing Device 261. In step 652, the System Control 140 of the Automated Control System 100 determines whether pressure is sufficient. If so, step 650 is reinitiated. If gas pressure is not sufficient, the System Control 140 opens the Gas Buffering System Supply Valve 262 in step 654 and activates the Gas Compressor in step 656. In step 658, the System Monitor 170 monitors gas pressure in the Gas Buffering Tank 266 during the fill process. In step 660, the System Control 170 determines whether the Gas Buffering Tank 266 is full (i.e., whether the pressure has reached the predetermined threshold). If not, the process returns to step 658. If the Gas Buffering Tank 266 is determined to be full, the System control 140 deactivates the Gas Compressor 264 and closes the Gas Buffering System Supply Valve 262 in steps 662 and 664. At this point, the process returns to step 650.

Figure 5:
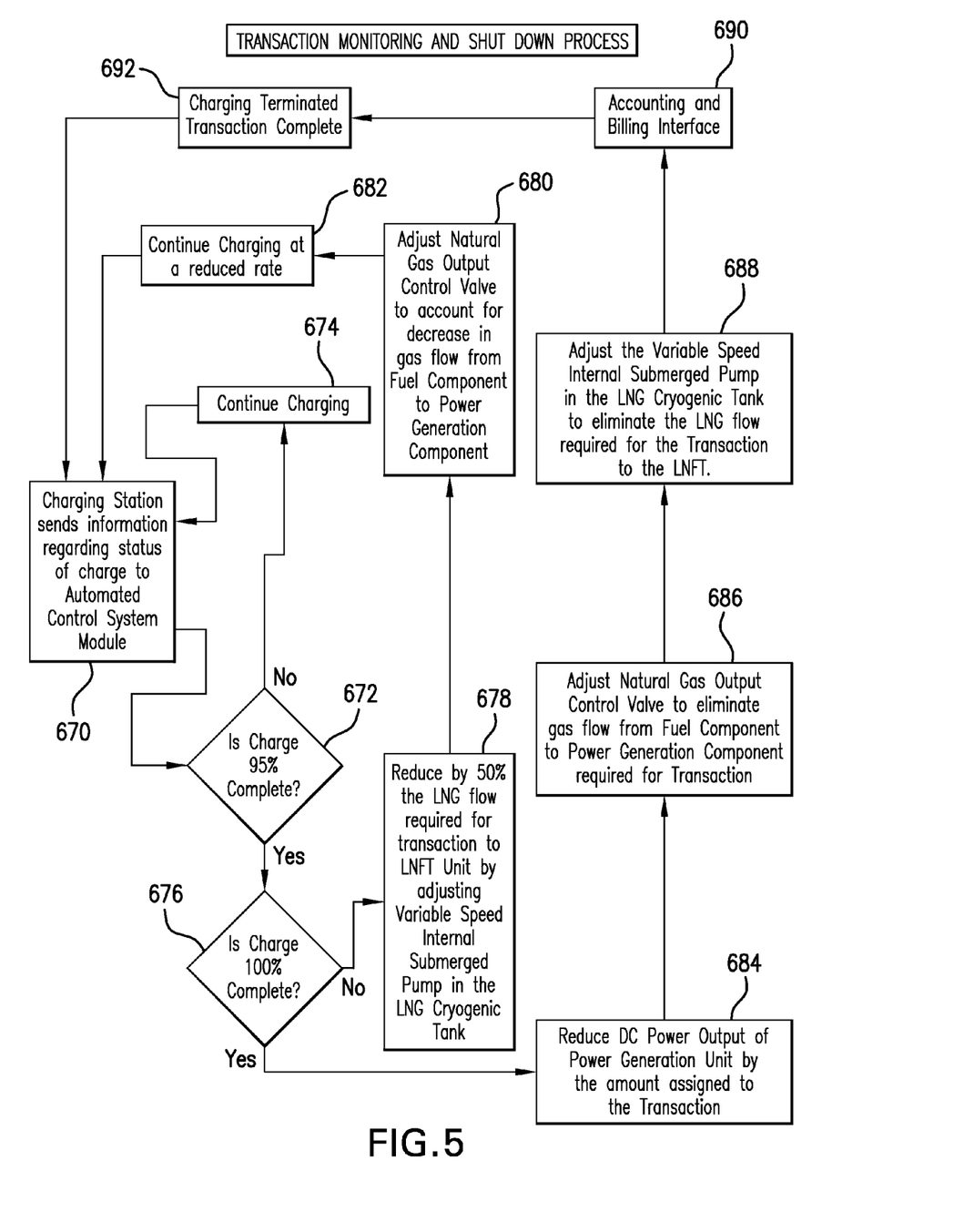

Referring now to FIG. 5, a flow chart depicts the transaction monitoring and shut down process. In step 670, the Customer Charging Station 410A, 410B sends information, including the completeness of the charge, regarding the status of charge to the System Monitor 170 of the Automated Control System Component 100. For instance, if the customer has selected to have a 75% charge and the vehicle is now 60% charged, that information is communicated to the Automated Control System. In step 672, the System Control 140 of the Automated Control System Component 100 determines whether the charge has reached 95% of the way to completion. If not, the System Control 140 continues charging in step 674 and the process returns to step 670. If the charge reaches 95% complete, the System Control 140 determines whether the charge has reached 100% completion. If not, the System Control 140 in step 678 slows the charging process by reducing by 50% the LNG flow required for the transaction to the LNFT 230 by adjusting the speed of Pump 212 in the LNG Storage Tank 210 and in step 680 adjusts the Fuel Component Output Control Valve to account for a decrease in the flow of Natural Gas 273 to the Power Generation Component 300. In step 682, the Fast Charge System 1 continues to charge the customer's vehicle at a reduced rated. The process then continuously loops between steps 670, 672, 676, 680, and 682 until it is determined in step 676 that the charge is 100% complete. When that occurs, the System Control 140 in step 684 reduces the output of DC Power 302 from the Power Generation Component 300 by the amount assigned to the transaction (if no other vehicles are being charged, the DC Power 302 will be reduced to zero; if other vehicles are being charged, the DC Power 302 will be reduced to the cumulative amount required for other transactions). In steps 686 and 688, the System Control 140 adjusts the Fuel Component Output Control Valve 272 to eliminate the flow of Natural Gas 273 from the Fuel Component 200 to the Power Generation Component 300 and adjusts the speed of the Pump 212 to eliminate the flow rate of the LNG 214 required for the transaction (if no other vehicles are being charged, the Fuel Component Output Control Valve 272 will be fully closed and the Pump 212 will be turned off; if other vehicles are being charged, the Fuel Component Output Control Valve 272 will be throttled and the speed of the Pump 212 will be reduced to accommodate the cumulative amount of LNG 214 and Natural Gas 273 required for other transactions). In step 690, the Accounting and Billing Interface 110 charges the customer's credit or debit card for the cost of the transaction. In step 692, charging is terminated and the transaction is complete.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

We claim:

1. An electric vehicle charging facility comprising:
a power generation component for generating a DC electric power, the power generation component comprising a plurality of fuel cells;
a fuel component supplying a fuel to the power generation component;
a charging component electrically connected to the power generation component for charging an electric vehicle using the DC electric power, the charging component comprising a first customer charging station.; and
a control system component, wherein the control system component comprises a processor, a data storage, and instructions stored in the data storage and executable by the processor to activate the plurality of fuel cells sequentially and randomly to meet an energy demand of the charging component.

2. The electric vehicle charging facility of claim 1, wherein further instructions stored in the data storage are executable by the processor to control a magnitude of the DC electric power according to the requirements of an electric vehicle.

3. The electric vehicle charging facility of claim 1, wherein further instructions stored in the data storage are executable by the processor to receive information from the charging component that is indicative of a charge in the electric vehicle and to reduce a magnitude of the DC electric power when the charge in the electric vehicle reaches a threshold value.

4. The electric vehicle charging facility of claim 1, wherein said charging component comprises a plurality of customer charging stations, the plurality of customer charging stations including the first customer charging station.

5. The electric vehicle charging facility of claim 1, wherein the instructions stored in the data storage are further executable by the processor to activate the plurality of fuel cells randomly to meet the energy demand of the charging component.

6. The electric vehicle charging facility of claim 1, wherein the power generation component includes a converter for converting at least a portion of the DC electric power to an AC electric power.

7. The electric vehicle charging facility of claim 1, wherein the fuel is a natural gas.

8. The electric vehicle charging facility of claim 7, wherein the natural gas is provided to the fuel component from a high capacity natural gas pipeline.

9. The electric vehicle charging facility of claim 7, wherein the fuel component comprises a fuel storage tank for storing a liquid natural gas and a liquid natural gas to natural gas transformer for transforming the liquid natural gas to the natural gas.

10. The electric vehicle charging facility of claim 9, wherein fuel component includes a bleed gas recovery system for recovering bleed gas from the fuel storage tank for use by the power generation component.

11. The electric vehicle charging facility of claim 9, wherein the fuel component includes a gas buffering system for providing natural gas to the power generation component substantially instantaneously, the gas buffering system including a gas storage tank and a compressor for storing the natural gas at an elevated pressure.

12. The electric vehicle charging facility of claim 9 further comprising a heat recovery system that transfers a heat generated by the fuel cell assembly to the natural gas.

13. The electric vehicle charging facility of claim 12 wherein the liquid natural gas to natural gas transformer includes an electric resistance heater for heating natural gas, and wherein the instructions stored in the data storage are further executable by the processor to activate the electric heater during system startup and to switch from the electric resistance heater to the heat recovery system after a period of time.

14. The electric vehicle charging facility of claim 9, wherein the heat recovery system is a closed water loop that receives heat from the fuel cell assembly via a first heat exchanger and transfer heat to the natural gas via a second heat exchanger.

15. The electric vehicle charging facility of claim 1, wherein each of the plurality of fuel cells is a polymer electrolyte membrane fuel cell.

16. The electric vehicle charging facility of claim 15, wherein each of the plurality of fuel cells has a maximum capacity of approximately 100 kW or less.

17. The electric vehicle charging facility of claim 1, wherein each of the plurality of fuel cells has a capacity between approximately 400 kW and approximately 500 kW.

18. The electric vehicle charging facility of claim 1 wherein the power generating component is connected to the charging component through a DC power grid.

19. An electric vehicle charging facility comprising:
a power generation component for generating a DC electric power, the power generation component comprising a plurality of polymer electrolyte membrane fuel cells each having a capacity of 100 kW or less;
a fuel component supplying a natural gas to the power generation component;
a charging component electrically connected to the power generation component for simultaneously charging a plurality of electric vehicles using the DC electric power, the charging component comprising a plurality of customer charging stations; and
a control system component, wherein the control system component comprises a processor, a data storage, and instructions stored in the data storage and executable by the processor to activate the plurality of fuel cells sequentially and randomly to meet an energy demand of the charging component.

20. The electric vehicle charging facility of claim 18 wherein the power generating component further comprises a DC to AC converter having an input coupled to a DC voltage, and wherein an output of the DC to AC converter is connectable to an AC power grid.

21. An electric vehicle charging facility comprising:
a power generation component for generating DC electric power, the power generation component comprising a plurality of fuel cells;
a fuel component supplying natural gas to the power generation component; and,
a charging component electrically connected to the power generation component for charging a plurality of electric vehicles using the DC electric power, the charging component comprising a first customer charging station; and
a control system component, wherein the control system component comprises a processor, a data storage, and instructions stored in the data storage and executable by the processor to activate the plurality of fuel cells sequentially and randomly to control a magnitude of the DC electric power according to the requirements of the plurality of electric vehicles and receive information from the charging component that is indicative of a charge in an electric vehicle and to reduce a magnitude of the DC electric power when the charge in the electric vehicle reaches a threshold value.

22. The electric vehicle charging facility of claim 21, wherein the fuel component comprises a fuel storage tank for storing a liquid natural gas and a liquid natural gas to natural gas transformer for transforming the liquid natural gas to the natural gas.

23. The electric vehicle charging facility of claim 22, wherein the fuel component further includes a bleed gas recovery system for recovering bleed gas from the fuel storage tank for use by the power generation component.

24. The electric vehicle charging facility of claim 23, wherein the fuel component further includes a gas buffering system for providing nearly instantaneous natural gas to the power generation component substantially instantaneously, the gas buffering system including a gas storage tank and a compressor for storing the natural gas at an elevated pressure.

* * * * *